United States Patent
Ishii et al.

[19]

[11] Patent Number: 6,053,066
[45] Date of Patent: Apr. 25, 2000

[54] SHIFTING DEVICE FOR AN AUTOMATIC TRANSMISSION

[75] Inventors: Shigeru Ishii, Atsugi; Masashi Sugiuchi, Hiratsuka; Mitsuru Fujioka, Fujisawa, all of Japan

[73] Assignee: Nissan Motor Co., Ltd., Yokohama, Japan

[21] Appl. No.: 09/124,062

[22] Filed: Jul. 29, 1998

[30] Foreign Application Priority Data

Jul. 29, 1997  [JP]  Japan .................................. 9-203298

[51] Int. Cl.⁷ ...................................................... B60K 20/00
[52] U.S. Cl. ........................................ 74/473.18; 74/484 R
[58] Field of Search ............................. 74/473.18, 484 R, 74/335; 200/61.88, 61.91

[56] References Cited

U.S. PATENT DOCUMENTS

| | | |
|---|---|---|
| 4,987,792 | 1/1991 | Mueller et al. . |
| 5,009,128 | 4/1991 | Seidel et al. ..................... 74/473.18 X |
| 5,357,820 | 10/1994 | Moroto et al. ................... 74/473.18 X |
| 5,365,803 | 11/1994 | Kelley et al. ......................... 74/484 R |
| 5,415,056 | 5/1995 | Tabata et al. ..................... 74/473.18 X |
| 5,425,686 | 6/1995 | Grange . |
| 5,520,066 | 5/1996 | Tueri . |
| 5,675,315 | 10/1997 | Issa et al. ......................... 200/61.88 X |
| 5,680,307 | 10/1997 | Issa et al. ......................... 74/473.18 X |
| 5,682,789 | 11/1997 | DeCrouppe et al. ............. 74/473.18 X |
| 5,799,539 | 9/1998 | Haase ................................... 74/473.18 |
| 5,847,344 | 12/1998 | Denyer et al. ....................... 200/61.88 |
| 5,862,708 | 1/1999 | Shamoto .............................. 74/473.18 |
| 5,865,705 | 2/1999 | Shamoto et al. ................. 74/473.18 X |

FOREIGN PATENT DOCUMENTS

| | | |
|---|---|---|
| 0 519 528 | 12/1992 | European Pat. Off. . |
| 0 582 505 | 2/1994 | European Pat. Off. . |
| 43 11 886 | 4/1993 | Germany . |
| 93 20 309 | 3/1994 | Germany . |

OTHER PUBLICATIONS

"Porsche: A Triptronic sports car from bumper to bumper", 2392 Review Automobile vol. 89 No. 19, p. 5, (Jul. 14, 1994) including {English Language Translation of Article, 3 pages}.

*Primary Examiner*—David A. Bucci
*Assistant Examiner*—Brandon C. Stallman
*Attorney, Agent, or Firm*—Foley & Lardner

[57] ABSTRACT

A shifting device for a vehicle automatic transmission comprises a manual shift mode which permits a driver to manually change a speed ratio by displacing a shift lever to an upshift or downshift direction from its neutral position in a manual operation lane. An upshift signal input terminal and a downshift signal input terminal are provided in a control unit. Upshift signals transmitted from an upshift switch of a selector and a steering switch on a steering wheel are input into the upshift signal input terminal, and downshift signals transmitted from a downshift switch of the selector and the steering switch on the steering wheel are input into the downshift signal input terminal. In this way, the number of input terminals of the control unit is reduced.

11 Claims, 3 Drawing Sheets

SHIFTING DEVICE FOR AN AUTOMATIC TRANSMISSION

FIELD OF THE INVENTION

The present invention relates to a shifting device for a vehicle automatic transmission, and in particular to a shifting device for an automatic transmission comprising a manual shift mode.

BACKGROUND OF THE INVENTION

A speed ratio in an automatic transmission for a vehicle is automatically changed according to vehicle speed and throttle opening, but some automatic transmissions have manual shift mode wherein a driver can change the speed ratio manually.

A shifting device for such an automatic transmission is disclosed in U.S. Pat. No. 4,987,792. When the driver intends to apply the manual shift mode, the driver moves a shift lever from the first shift lane to the second shift lane through a changeover lane. In the manual shift mode, when the driver moves the shift lever in an upshift direction from a neutral position, an upshift command is output to the transmission, and when the driver moves the shift lever in a downshift direction from the neutral position, a downshift command is output to the transmission. Whether the shift lever has moved to the second shift lane, or whether the shift lever has moved in the upshift or downshift direction, is detected by plural switches provided in the changeover lane and the second shift lane.

U.S. Pat. No. 5,520,066 discloses a similar shifting device but further comprises a steering switch on the steering wheel for selecting an upshift or downshift operation. By operating this steering switch, the driver can change the speed ratio without operating the shift lever.

SUMMARY OF THE INVENTION

However, in this device, the number of signals input into a control unit increases because of the increase of switches, the number of input terminals and harnesses increases, and so the cost of the device increases.

Moreover, even if there was a faulty switch which was always in a conducting or non-conducting state, the shifting device could not determine whether or not it had a fault.

It is therefore an object of this invention to reduce the number of input terminals of a control unit of a shifting device which is equipped with an upshift and downshift switch on the steering wheel.

It is a further object of this invention to determine a faulty switch in a shifting device.

According to an aspect of this invention as described in claim 1, a shifting device for an automatic transmission of a vehicle with a steering wheel, comprises a shift lever for selecting an automatic shift mode and a manual shift mode, and for selecting either of upshift and downshift operations when the manual shift mode is selected, a control unit for outputting upshift and downshift commands to said transmission based on an upshift signal and a downshift signal, a shift switch for transmitting the upshift signal to the control unit when the shift lever has selected the upshift operation and for transmitting the downshift signal to the control unit when the shift lever has selected the downshift operation, and a steering switch disposed on the steering wheel for transmitting the upshift signal and the downshift signal to the control unit. The control unit comprises a unique upshift signal input terminal for inputting the upshift signal transmitted from the shift switch as well as from the steering switch, and a unique downshift signal input terminal for inputting the downshift signal transmitted from the shift switch as well as from the steering switch. Hence, the number of input terminals and harnesses of the control unit can be reduced.

The details as well as other features and advantages of this invention are set forth in the remainder of the specification and are shown in the accompanying drawings.

DESCRIPTION OF THE PREFERRED EMBODIMENTS

Figure 1:
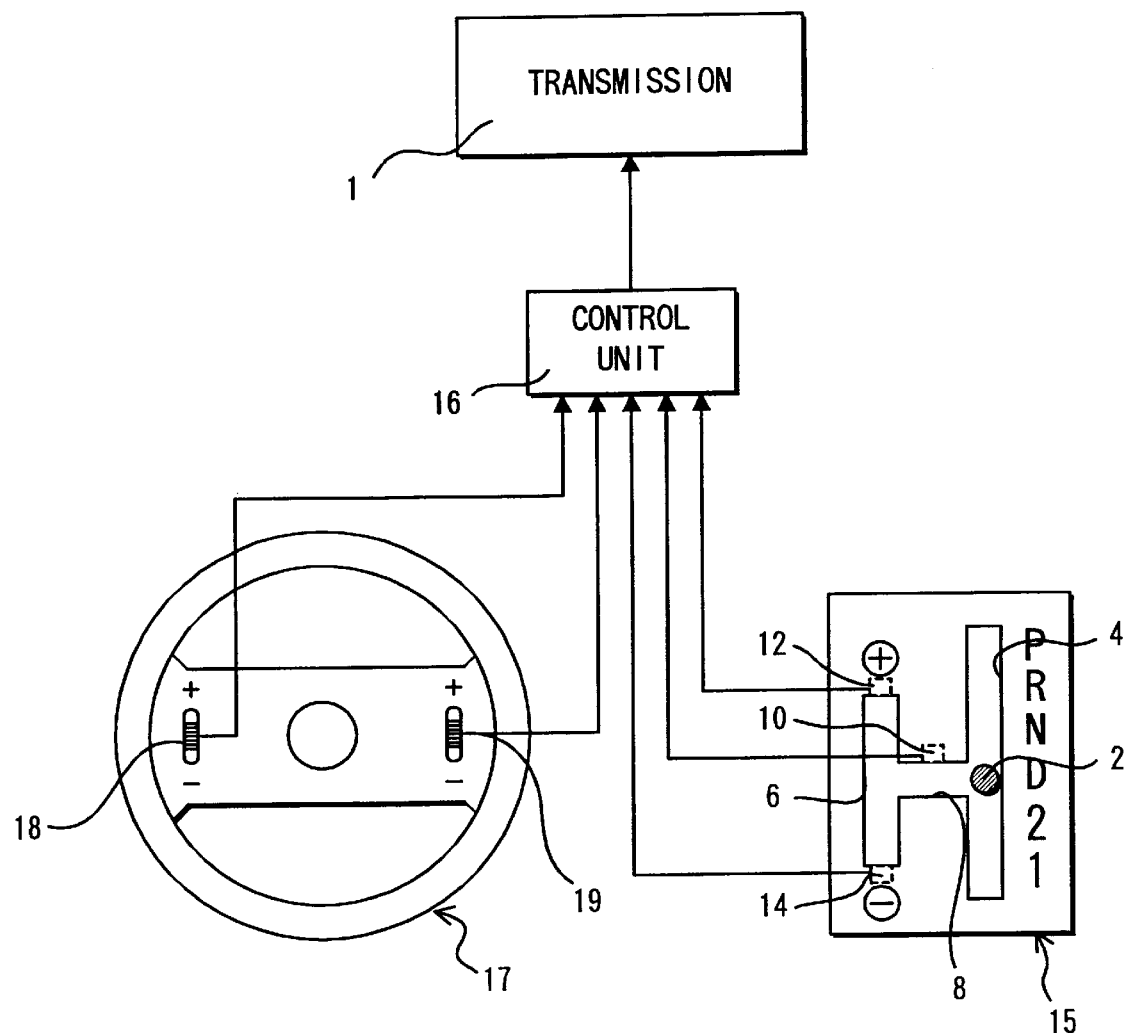
FIG. 1 is a schematic diagram of a transmission control system comprising a shifting device according to this invention.

Referring to FIG. 1 of the drawings, a shifting device of an automatic transmission 1 comprises a selector 15, a steering wheel 17 and a control unit 16.

The selector 15 comprises a shift lever 2 which is arranged to move in a selector lane 4, a manual operation lane 6 and a changeover lane 8 connecting therebetween.

In the selector lane 4, the shift lever 2 is placed in any of six positions, i. e. a parking range "P", reverse range "R", neutral range "N", drive range "D", second range "2" and first range "1" arranged in that order in the lane in the front/back direction of a vehicle.

The manual operation lane 6 is provided parallel to the selector lane 4 centered on a position corresponding to the drive range "D". In the manual operation lane, the shift lever 2 is maintained at its neutral position, and according to an operation by the driver, it is moved in an upshift (+) direction or downshift (−) direction. The changeover lane 8 connects the selector lane 4 and manual operation lane 6 at a position corresponding to the drive range "D". The shift lever 2 displaces between the selector lane 4 and manual operation lane 6 via the changeover lane 8.

When the driver displaces the shift lever 2 to the manual operation lane 6 from the drive range "D" of the selector lane 4 via the changeover lane 8, the shifting device enters the manual shift mode. In this manual shift mode, when the driver displaces the shift lever 2 in the upshift direction in the manual operation lane 6, the automatic transmission 1 shifts up to the next higher gear. When the driver displaces the shift lever 2 in the downshift direction in the manual operation lane 6, the automatic transmission 1 shifts down to the next lower gear.

A manual mode switch 10 is provided in the changeover lane 8 to detect whether the shift lever 2 has moved to the manual operation lane 6. In the manual operation lane 6, an upshift switch 12 to detect whether the shift lever 2 is in the upshift position of the lane and a downshift switch 14 to detect whether the shift lever 2 is in the downshift position of the lane are provided. In the selector lane 4, an inhibitor switch, not shown, which detects whether the shift lever 2 is in the "P", "R", "N", "D", "2" or "1" range is provided.

A first steering switch 18 and a second steering switch 19 are installed on the steering wheel 17, and they are respectively situated to the left side and right side of the center position. When the driver displaces a moving part of the steering switches 18 or 19 upwards, the upshift operation is selected, and when the driver displaces the moving part downwards, the downshift operation is selected.

Figure 2:
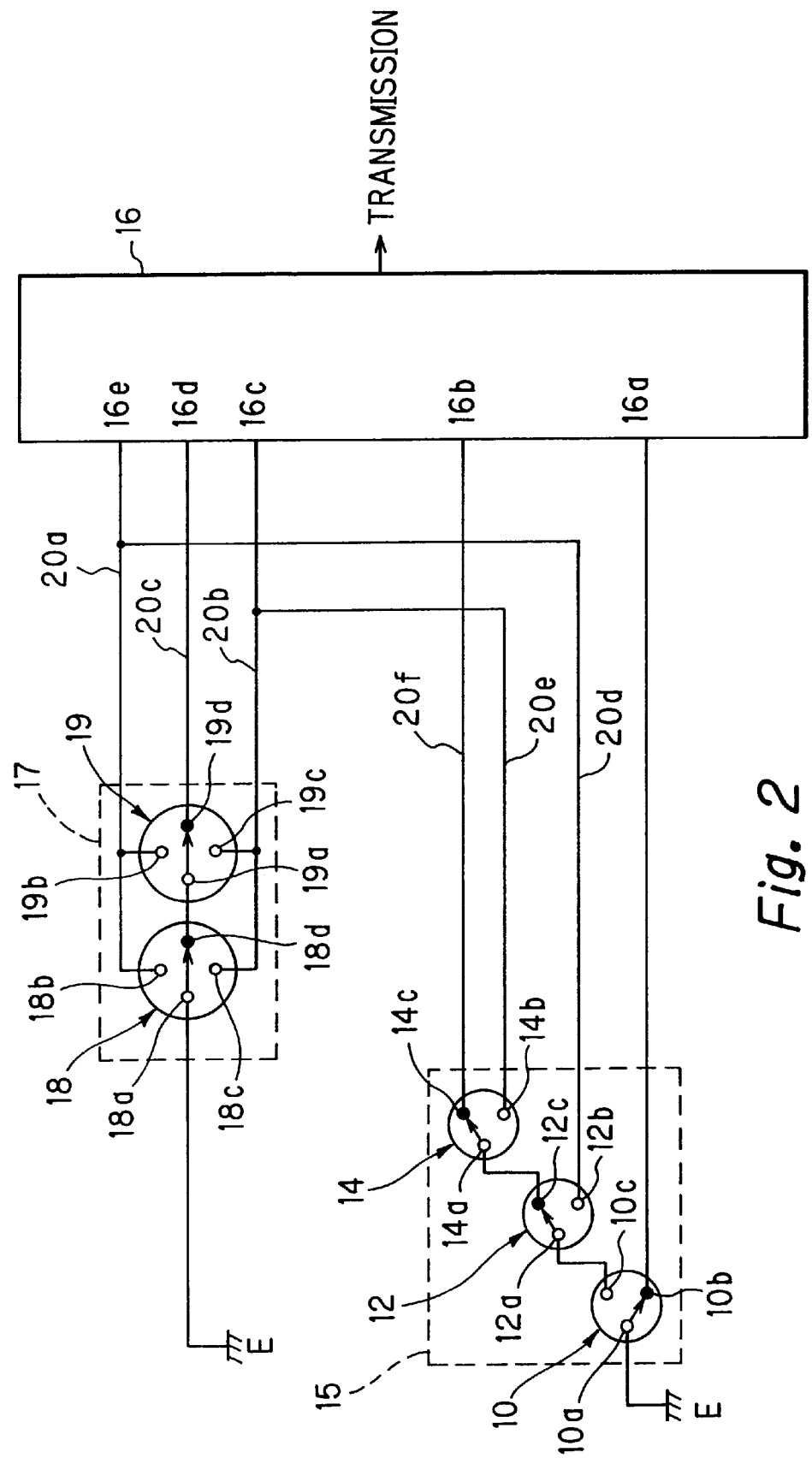
FIG. 2 is a control circuit diagram of the shifting device.

FIG. 2 is a circuit diagram of the shifting device.

The shifting device comprises the first steering switch 18, second steering switch 19, manual mode switch 10, upshift switch 12, downshift switch 14 and control unit 16 provided with five input terminals from a first input terminal 16a to a fifth input terminal 16e which are connected to these switches. The manual mode switch 10, upshift switch 12 and downshift switch 14 are connected in series to the control unit 16.

In the manual mode switch 10, a first traveling contact 10a is grounded, a first contact 10b is connected to the first input terminal 16a of the control unit 16, and a second contact 10c is connected to a second traveling contact 12a of the upshift switch 12.

In the upshift switch 12, a third contact 12b is connected to a first signal line 20a via a fourth signal line 20d, and a fourth contact 12c is connected to a third traveling contact 14a of the downshift switch 14.

In the downshift switch 14, a fifth contact 14b is connected to a second signal line 20b via a fifth signal line 20e, and a sixth contact 14c is connected to the second input terminal 16b of the control unit 16 via a sixth signal line 20f.

In the first steering switch, when the driver selects the upshift operation of the first steering switch 18, a seventh contact 18b is in electrical contact with a fourth traveling contact 18a, and an ON signal is input into the fifth input terminal 16e of the controller 16 via the first signal line 20a When the driver selects the downshift operation of the first steering switch 18, an eighth contact 18c is in electrical contact with the fourth traveling contact 18a, and an ON signal is input into the third input terminal 16c of the controller 16 via the second signal line 20b.

Similarly, in the second steering switch, when the driver selects the upshift operation of the second steering switch 19, an another seventh contact 19b is in contact with an another fourth traveling contact 19a, and an ON signal is input into the fifth input terminal 16e of the controller 16 via the first signal line 20a. When the driver selects the downshift operation of the second steering switch 19, an another eighth contact 19c is in contact with the another fourth traveling contact 19a, and an ON signal is input into the third input terminal 16c of the controller 16 via the second signal line 20b.

A ninth contact 18d of the first steering switch 18 is connected to the another fourth traveling contact 19a of the second steering switch 19, and a tenth contact 19d of the second steering switch 19 is connected to the fourth input terminal 16d of the control unit 16 via a third signal line 20c.

In this control circuit, an ON signal is input into a predetermined input terminal of the control unit 16 according to an operation of the shift lever 2 of the selector 15 or an operation of the steering switches 18, 19 on the steering wheel 17.

For example, an ON signal is input into the first input terminal 16a of the control unit 16 when the shift lever 2 is situated in the selector lane 4.

When the shift lever 2 moves from the selector lane 4 to the manual operation lane 6 via the changeover lane 8, and moves to neither the upshift direction nor the downshift direction, i.e. when the shift lever 2 is in the neutral position in the manual operation lane 6, an ON signal is input into the second input terminal 16b of the control unit 16.

When the shift lever 2 moves in the upshift direction from the neutral position, an ON signal is input into the fifth input terminal 16e of the control unit 16, and when the shift lever 2 moves in the downshift direction from the neutral position, an ON signal is input into the third input terminal 16c of the control unit 16.

When the first steering switch 18 selects the upshift operation, an ON signal is input into the fifth input terminal 16e of the control unit 16, and when the first steering switch 18 selects the downshift operation, an ON signal is input into the third input terminal 16c of the control unit 16. Similarly, when the second steering switch 19 selects the upshift operation, an ON signal is input into the fifth input terminal 16e of the control unit 16, and when the second steering switch 19 selects the downshift operation, an ON signal is input into the third input terminal 16c of the control unit 16.

When the steering switches 18, 19 have selected neither the upshift nor downshift operation, an ON signal is input into the fourth input terminal 16d of the control unit 16.

In this embodiment, as the fourth signal line 20d is connected to the first signal line 20a, a signal when the shift lever 2 moves in the upshift direction and a signal when either the first steering switch 18 or second steering switch 19 selects the upshift operation, are input into the fifth input terminal 16e together.

Also, as the fifth signal line 20e is connected to the second signal line 20b, a signal when the shift lever 2 moves in the downshift direction and a signal when either the first steering switch 18 or second steering switch 19 selects the downshift operation, are input into the third input terminal 16c together.

In this way, as the terminal to which a signal from the steering wheel 17 is input is also the terminal to which a signal from the selector 15 is input, a lesser number of input terminals are needed in the control unit 16, and the number of harnesses is also less.

Figure 3:
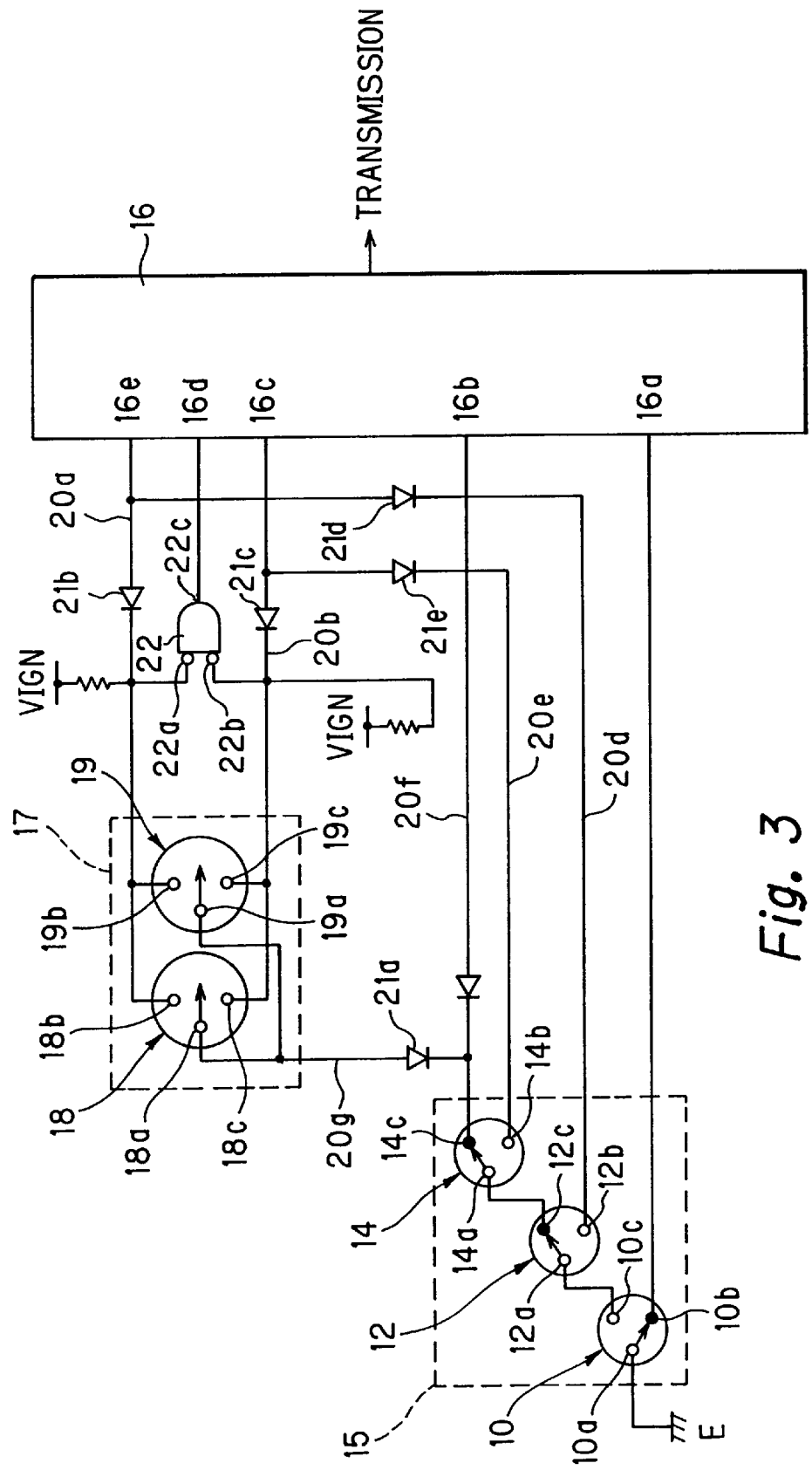
FIG. 3 similar to FIG. 2, but showing a second embodiment of this invention.

FIG. 3 shows a second embodiment of this invention.

This embodiment is different from the first embodiment in the construction of the first steering switch 18 and second steering switch 19 on the steering wheel 17. Herein these switches respectively comprise a traveling contact and two contacts.

The fourth traveling contact 18a of the first steering switch 18 is connected to the sixth signal line 20f via a seventh signal line 20g that comprises a diode 21a. The sixth signal line 20f connects the second input terminal 16b of the control unit 16 to the sixth contact 14c of the downshift switch 14.

The seventh contact 18b of the first steering switch 18 is connected to the fifth input terminal 16e of the controller 16 via the first signal line 20a which comprises a diode 21b. The eighth contact 18c is connected to the third input terminal 16c of the controller 16 via the second signal line 20b which comprises a diode 21c.

The another fourth traveling contact 19a of the second steering switch 19 is connected to the seventh signal line 20g further upstream than the diode 21a. The another seventh contact 19b is connected to the first signal line 20a, and the another eighth contact 19c is connected to the second signal line 20b.

A first AND input terminal 22a and a second AND input terminal 22b of an AND circuit 22 are respectively connected to a predetermined position further downstream than the diode 21b of the first signal line 20a and a predetermined position further downstream than the diode 21c of the second signal line 20b. An AND output terminal 22c of the AND circuit 22 is connected to the fourth input terminal 16d of the control unit 16.

When there is no current in the first signal line 20a nor in the second signal line 20b, an ON signal is input into the fourth input 16d of the controller 16 from the output terminal 22c of the AND circuit 22.

A diode 21d is interposed in the fourth signal line 20d which connects the third contact 12b of the upshift switch 12 and the first signal line 20a. A diode 21e is interposed in the fifth signal line 20e which connects the fifth contact 14b of the downshift switch 14 and the second signal line 20b.

In this control circuit, when the shift lever 2 is situated in the selector lane 4, an ON signal is input into the first input terminal 16a of the control unit 16.

When the shift lever 2 moves to the manual operation lane 6 from the selector lane 4 via the changeover lane 8 and moves in neither the upshift direction nor the downshift direction, i.e. when the shift lever is in the neutral position in the manual operation lane 6, an ON signal is input into the second input terminal 16b of the control unit 16.

When the ON signal is input into the second input terminal 16b of the control unit 16 and the first steering switch 18 selects the upshift operation, the seventh contact 18b is connected to the fourth traveling contact 18a, and an ON signal is input into the fifth input terminal 16e of the control unit 16.

When the ON signal is input into the second input terminal 16b and the first steering switch 18 selects the downshift operation, the eighth contact 18c is connected to the fourth traveling contact 18a, and an ON signal is input into the third input terminal 16c of the control unit 16.

Similarly, when the ON signal is input into the second input terminal 16b and the second steering switch 19 selects the upshift operation, an ON signal is input into the fifth input terminal 16e of the control unit 16, and when the second steering switch 19 selects the downshift operation, an ON signal is input into the third input terminal 16c of the control unit 16.

As there is no current in the first signal line 20a and second signal line 20b when the first steering switch 18 and second steering switch 19 have not selected either the upshift operation or downshift operation, an ON signal is input into the fourth input terminal 16d of the control unit 16 from the AND circuit 22.

When the shift lever 2 moves in the upshift direction, an ON signal is input into the fifth input terminal 16e of the control unit 16, and when the shift lever 2 moves in the downshift direction, an ON signal is input into the third input terminal 16c of the control unit 16.

When the shift lever 2 moves in the upshift direction or the downshift direction, the fourth contact 12c of the upshift switch 12 becomes isolated from the second traveling contact 12a, or the sixth contact 14c of the upshift switch 14 becomes isolated from the third traveling contact 14a. Due to this, when the driver is operating the shift lever in manual shift mode, the first steering switch 18 and the second steering switch 19 can no longer select the upshift operation, or the downshift operation.

Therefore, when the shift lever 2 has moved in the upshift direction or downshift direction, selection of the upshift operation and downshift operation by the first steering switch 18 and the second steering switch 19 are impossible, so erroneous driver operation is prevented.

The first steering switch 18 and the second steering switch 19 of this embodiment are switches comprising a traveling contact and two contacts. As this structure is simpler than the switch having a traveling contact and three contacts used in the first embodiment, a control circuit of still lower cost can be provided.

The control unit 16 can also determine a fault in the manual mode switch 10, upshift switch 12, downshift switch 14 and steering switches 18, 19.

For example, the control unit 16 can determine that the manual mode switch 10 is faulty when an OFF signal is input into the first input terminal 16a, second input terminal 16b, third input terminal 16c and fifth input terminal 16e continuously for a predetermined time.

Further, when an ON signal is input into the second input terminal 16b, fifth input terminal 16e and fourth input terminal 16d, the control unit 16 can determine that the third contact 12b of the upshift switch 12 is earthed.

Similarly, when an ON signal is input into the second input terminal 16b, third input terminal 16c and fourth input terminal 16d, the control unit 16 can determine that the downshift switch 14 is faulty. Also, when an ON signal is input into the first input terminal 16a and fifth input terminal 16e, and an OFF signal is input into the fourth input terminal 16d, the control unit 16 can determine that the seventh contact 18b of the first steering switch 18 or the another seventh contact 19b of the second steering switch 19 is earthed.

Similarly, when an ON signal is input into the first input terminal 16a and the third input terminal 16c, and an OFF signal is input into the fourth input terminal 16d, the control unit 16 can determine that the first steering switch 18 or the second steering switch 19 is faulty.

In the embodiment shown in FIG. 2 and FIG. 3, the three switches in the selector 15 were connected in the order manual mode switch 10, upshift switch 12 and downshift switch 14, but the same effect is obtained if the downshift switch 14 and upshift switch 12 are interchanged, and the switches are connected in the order manual mode switch 10, downshift switch 14 and upshift switch 12.

The contents of Japanese Application No. 9-203298, with a filing date Jul. 29, 1997 in Japan, are hereby incorporated by reference.

The embodiments of this invention in which an exclusive property or privilege is claimed are defined as follows:

1. A shifting device for an automatic transmission of a vehicle with a steering wheel, comprising:

a shift lever for selecting an automatic shift mode and a manual shift mode, and for selecting either of upshift and downshift operations when said manual shift mode is selected;

a control unit for outputting upshift and downshift commands to said transmission based on an upshift signal and a downshift signal;

a shift switch for transmitting said upshift signal to said control unit when said shift lever has selected said upshift operation and for transmitting said downshift signal to said control unit when said shift lever has selected said downshift operation; and a steering switch disposed on said steering wheel for transmitting said upshift signal and said downshift signal to said control unit;

wherein said control unit comprises two input terminals, one input terminal for inputting said upshift signal transmitted from said shift switch and said steering switch, and another input terminal for inputting said downshift signal transmitted from said shift switch and said steering switch.

2. A shifting device as defined in claim 1, comprising a circuit that disables the transmission of said upshift and downshift signals from said steering switch when said shift switch transmits either of said upshift signal and said downshift signal to said control unit.

3. A shifting device as defined in claim 1, wherein said shift switch comprises a manual mode switch for detecting whether or not said shift lever has selected said manual shift mode, an upshift switch for detecting whether or not said shift lever has selected said upshift operation, and a downshift switch for detecting whether or not said shift lever has selected said downshift operation, said manual mode switch comprises a first traveling contact which is earthed, a first contact which is connected to said first traveling contact when said shift lever has selected said automatic shift mode, and a second contact which is connected to said first traveling contact when said shift lever has selected said manual shift mode, said upshift switch comprises a second traveling contact connected to said second contact of said manual mode switch, a third contact which is connected to said second traveling contact when said shift lever has selected said upshift operation, and a fourth contact which is connected to said second traveling contact when said shift lever has not selected said upshift operation, said downshift switch comprises a third traveling contact connected to said fourth contact of said upshift switch, a fifth contact which is connected to said third traveling contact when said shift lever has selected said downshift operation, and a sixth contact which is connected to said third traveling contact when said shift lever has not selected said downshift operation, said steering switch comprises a fourth traveling contact connected to said sixth contact of said downshift switch, a seventh contact connected to said upshift signal input terminal, and an eighth contact connected to said downshift signal input terminal, and said shifting device further comprises a circuit which transmits either of said upshift signal and said downshift signal to said control unit from said steering switch, when said second contact of said manual mode switch is connected to said first traveling contact, said fourth contact of said upshift switch is connected to said second traveling contact, and said sixth contact of said downshift switch is connected to said third traveling contact.

4. A shifting device as defined in claim 1, wherein said shift switch comprises a manual mode switch for detecting whether or not said shift lever has selected said manual shift mode, an upshift switch for detecting whether or not said shift lever has selected said upshift operation, and a downshift switch for detecting whether or not said shift lever has selected said downshift operation, said manual mode switch comprises a first traveling contact which is earthed, a first contact which is connected to said first traveling contact when said shift lever has selected said automatic shift mode, and a second contact which is connected to said first traveling contact when said shift lever has selected said manual shift mode, said downshift switch comprises a third traveling contact connected to said second contact of said manual mode switch, a fifth contact which is connected to said third traveling contact when said shift lever has selected said downshift operation, and a sixth contact which is connected to said third traveling contact when said shift lever has not selected said downshift operation, said upshift switch comprises a second traveling contact connected to said sixth contact of said downshift switch, a third contact which is connected to said second traveling contact when said shift lever has selected said upshift operation, and a fourth contact which is connected to said second traveling contact when said shift lever has not selected said upshift operation, said steering switch comprises a fourth traveling contact connected to said fourth contact of said upshift switch, a seventh contact connected to said upshift signal input terminal, and an eighth contact connected to said downshift signal input terminal, and said shifting device further comprises a circuit which transmits either of said upshift signal and said downshift signal to said control unit from said steering switch, when said second contact of said manual mode switch is connected to said first traveling contact, said fourth contact of said upshift switch is connected to said second traveling contact, and said sixth contact of said downshift switch is connected to said third traveling contact.

5. A shifting device as defined in claim 1, wherein said steering switch comprises a fourth traveling contact, a seventh contact connected to said upshift signal input terminal and an eighth contact connected to said downshift signal input terminal, and said shifting device further comprises an AND circuit comprising a first AND input terminal connected to said seventh contact and said upshift signal input terminal, a second AND input terminal connected to said eighth contact and said downshift signal input terminal, and an AND output terminal connected to a predetermined input terminal of said control unit.

6. A shift device as defined in claim 1, comprising:

a first upshift line for transmitting the upshift signal from said steering switch, one end of the first upshift line being connected to said steering switch, the other end of the first upshift line being connected to said input terminal for inputting the upshift signal;

a second upshift line for transmitting the upshift signal from said shift switch, one end of the second upshift line being connected to said shift switch, the other end of the second upshift line being connected to said first upshift line;

a first downshift line for transmitting the downshift signal from said steering switch, one end of the first downshift line being connected to said steering switch, the other end of the first downshift line being connected to said input terminal for inputting the downshift signal; and a second downshift line for transmitting the downshift signal from said shift switch, one end of the second downshift line being connected to said shift switch, the other end of the second downshift line being connected to said first downshift line.

7. A shifting device as defined in claim 6, wherein said steering switch comprises:

a fourth traveling contact which is grounded;

a seventh contact connected to said first upshift line, the seventh contact being connected to said fourth traveling contact when the steering switch has selected the upshift operation; and an eighth contact connected to said first downshift line, the eighth contact being connected to said fourth traveling contact when the steering switch has selected the downshift operation;

wherein said control unit further comprises a steering switch neutral input terminal for inputting a signal when the steering switch is in the neutral position.

8. A shifting device as defined in claim 7, wherein said shift switch comprises a manual mode switch for detecting whether or not said shift lever has selected said manual shift mode, an upshift switch for detecting whether or not said shift lever has selected said upshift operation, and a downshift switch for detecting whether or not said shift lever has selected said downshift operation;

said manual mode switch comprises a first traveling contact which is grounded, a first contact which is connected to said first traveling contact when said shift lever has selected said automatic shift mode, and a second contact which is connected to said first traveling contact when said shift lever has selected said manual shift mode;

said upshift switch comprises a second traveling contact, a third contact connected to said second upshift line, the third contact being connected to said second traveling contact when said shift lever has selected said upshift operation, and a fourth contact which is connected to said second traveling contact when said shift lever is in a neutral position; and said downshift switch comprises a third traveling contact, a fifth contact connected to said second downshift line, the fifth contact being connected to said third traveling contact when said shift lever has selected said downshift operation, and a sixth contact which is connected to said third traveling contact when said shift lever is in the neutral position;

wherein said second traveling contact is connected to said second contact and said third traveling contact is connected to said fourth contact.

9. A shifting device as defined in claim 7, wherein said shift switch comprises a manual mode switch for detecting whether or not said shift lever has selected said manual shift mode, an upshift switch for detecting whether or not said shift lever has selected said upshift operation, and a downshift switch for detecting whether or not said shift lever has selected said downshift operation;

said manual mode switch comprises a first traveling contact which is grounded, a first contact which is connected to said first traveling contact when said shift lever has selected said automatic shift mode, and a second contact which is connected to said first traveling contact when said shift lever has selected said manual shift mode;

said upshift switch comprises a second traveling contact, a third contact connected to said second upshift line, the third contact being connected to said second traveling contact when said shift lever has selected said upshift operation, and a fourth contact which is connected to said second traveling contact when said shift lever is in a neutral position; and said downshift switch comprises a third traveling contact, a fifth contact connected to said second downshift line, the fifth contact being connected to said third traveling contact when said shift lever has selected said downshift operation, and a sixth contact which is connected to said third traveling contact when said shift lever is in the neutral position;

wherein said third traveling contact is connected to said second contact and said second traveling contact is connected to said sixth contact.

10. A shifting device as defined in claim 7, wherein said control unit further comprises a shift lever neutral input terminal for inputting a signal when the shift lever has selected said manual shift mode and is in the neutral position.

11. A shifting device as defined in claim 10, further comprising:

a fourth traveling contact which is grounded;

a seventh contact connected to said first upshift line, the seventh contact being connected to said fourth traveling contact when the steering switch has selected the upshift operation; and an eighth contact connected to said first downshift line, the eighth contact being connected to said fourth traveling contact when the steering switch has selected the downshift operation;

wherein said control unit further comprises a steering switch neutral input terminal for inputting a signal when the steering switch is in the neutral position.

* * * * *